United States Patent [19]
Wehunt

[11] Patent Number: 5,375,660
[45] Date of Patent: Dec. 27, 1994

[54] METHOD TO INCREASE THE FLOW CAPACITY OF A GEOLOGIC FORMATION

[75] Inventor: C. Dean Wehunt, Kingwood, Tex.

[73] Assignee: Chevron Research and Technology Company, San Francisco, Calif.

[21] Appl. No.: 957,589

[22] Filed: Oct. 7, 1992

[51] Int. Cl.⁵ ............................................. E21B 43/27
[52] U.S. Cl. ................................ 166/271; 166/300; 166/307
[58] Field of Search .............. 166/270, 271, 281, 300, 166/307; 252/8.553

[56] References Cited

U.S. PATENT DOCUMENTS

| | | | |
|---|---|---|---|
| 2,094,479 | 9/1937 | Vandergrift et al. | 166/21 |
| 3,953,340 | 4/1976 | Templeton et al. | 252/8.55 |
| 4,056,146 | 11/1977 | Hall | 166/300 |
| 4,090,563 | 5/1978 | Lybarger et al. | 166/307 |
| 4,414,118 | 11/1983 | Murphey | 252/8.55 |
| 5,082,058 | 1/1992 | Blumer | 166/307 X |

OTHER PUBLICATIONS

H. Perthuis et al., Acid Reactions and Damage Removal in Sandstones: A Model for Selecting the the Acid Formulation, 11, 125–136 (1969).

Society of Petroleum Engineers, Formation Damage Control, 2, 552–553 (1992).

Primary Examiner—William P. Neuder
Attorney, Agent, or Firm—J. S. Reid; E. A. Schaal; W. K. Turner

[57] ABSTRACT

Minerals in a subterranean formation are dissolved by treating them in the presence of an organic acid with a fluoride-containing compound having a concentration in the range of from 0.007 N to 0.05 N. The hydrogen ion concentration can be less than 0.02 N, preferably less than 0.004 N. The fluoride-containing compound can be hydrofluoric acid. Alternatively, the minerals can be treated by applying alternating stages of a solution of fluoride salt, such as ammonium fluoride or ammonium bifluoride, and an organic acid, such as acetic acid. The treatment can be done in a formation at a temperature of at least 350° F.

9 Claims, 2 Drawing Sheets

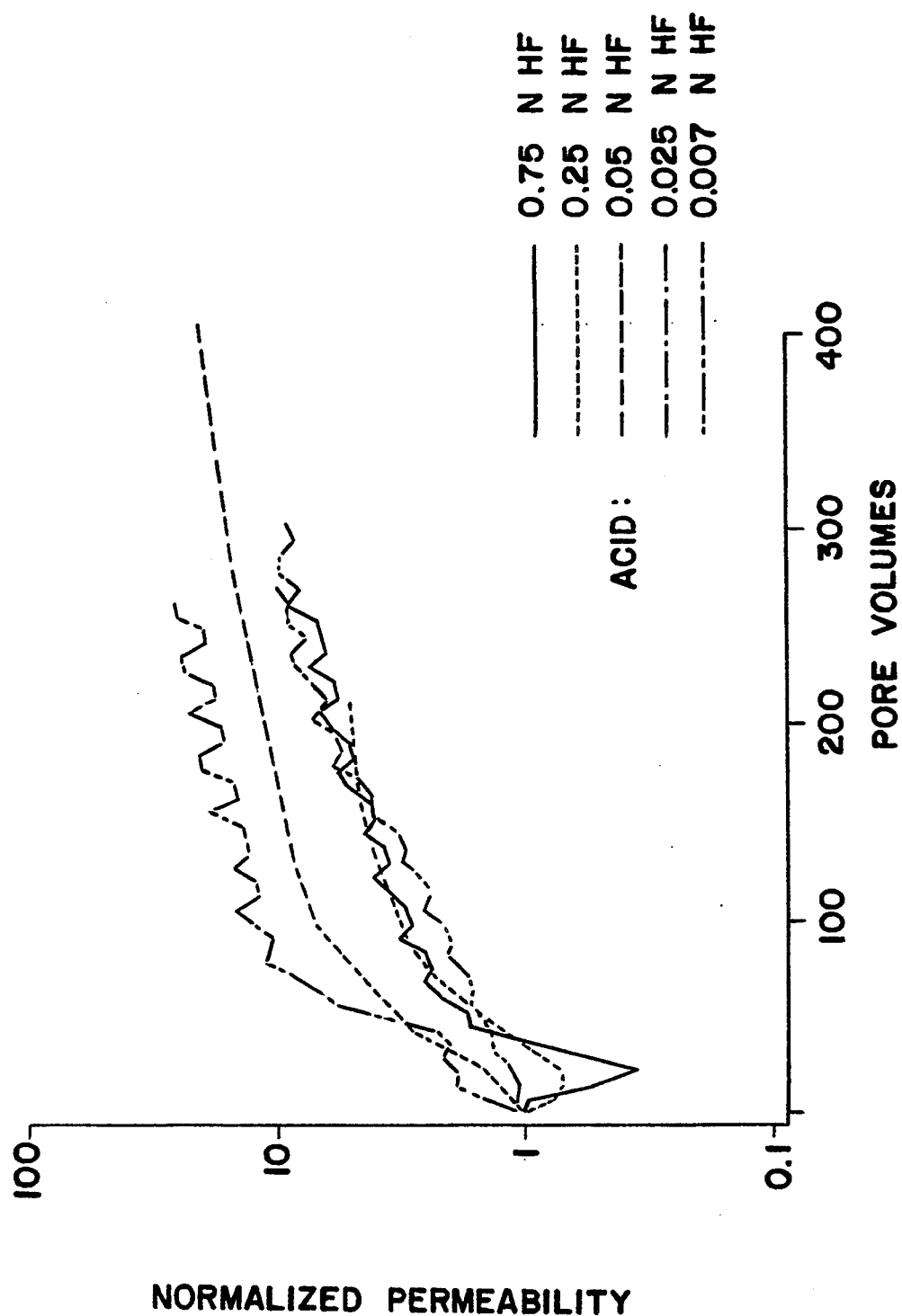
FIG_1

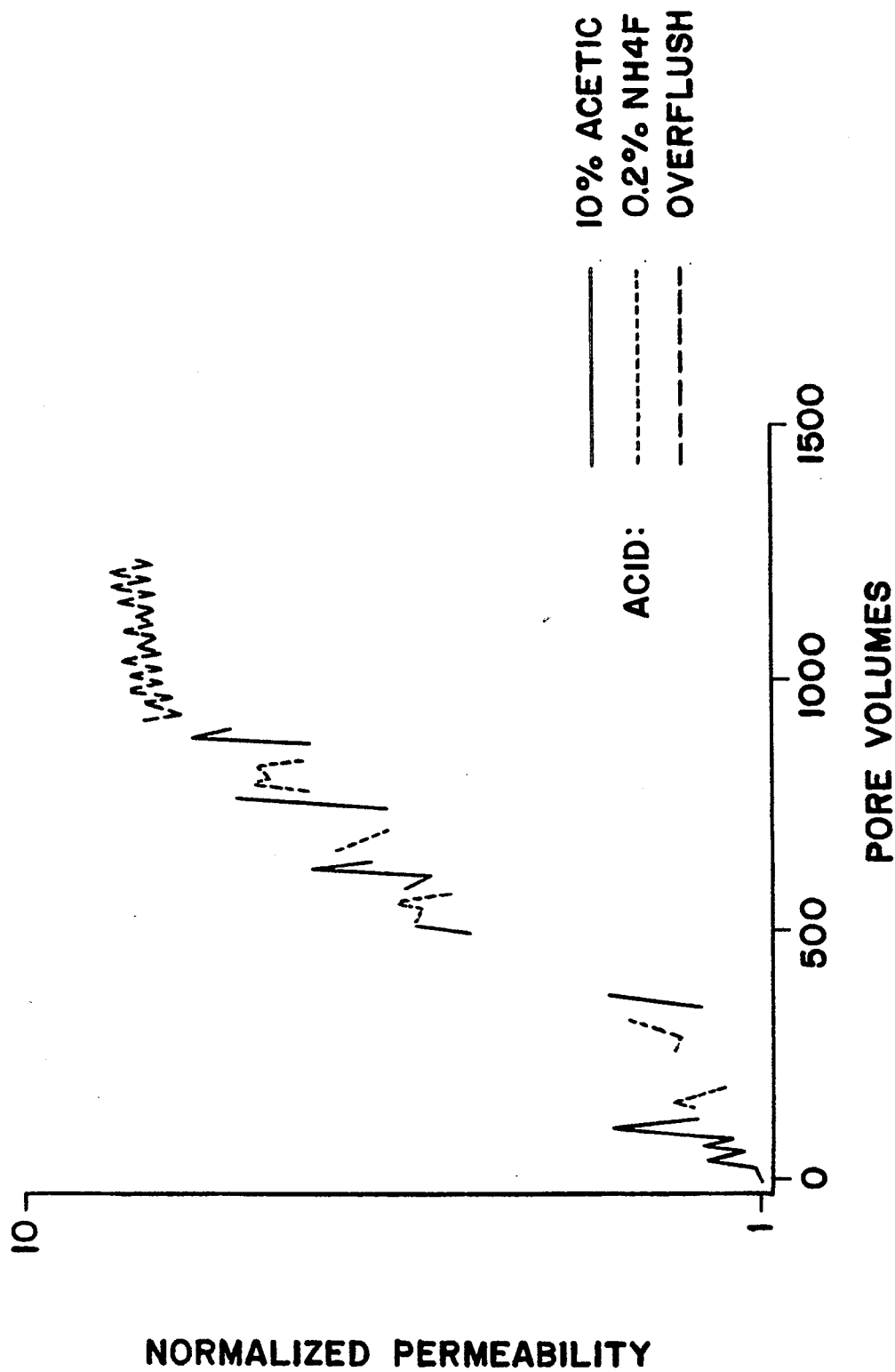
FIG_2

METHOD TO INCREASE THE FLOW CAPACITY OF A GEOLOGIC FORMATION

BACKGROUND OF THE INVENTION

Acidization involves treating a formation with an acid (typically hydrochloric, hydrofluoric, and mixtures thereof) in order to dissolve clogging deposits, such as inorganic scales and minerals, to increase formation permeability. It facilitates flow of formation fluids (such as oil or natural gas) into the well from the formation. It also facilitates injection of fluids (such as water, nitrogen, natural gas, or carbon dioxide) through the well into the formation.

Numerous acidization methods have been proposed to cope with different well conditions and special formation problems. In recent years, the increased activity in drilling very deep wells has outpaced the development of suitable high temperature acidization methods. There are three problems common to many prior art acidization methods.

One problem is corrosion of the well equipment, particularly the downhole tubing and casing, which are exposed to the acidizing fluid. This problem is especially serious in acidization of high temperature reservoirs because the reactivities of acids significantly increase at higher temperatures.

A second problem is excessive dissolution of quartz at high temperatures. A sandstone petroleum reservoir can be thought of as a framework of quartz grains, with feldspars, clay minerals, and quartz fragments plugging some of the flow channels between the quartz grains. To improve the permeability of the formation, it is important to dissolve the channel-plugging material without dissolving the quartz grain framework. If too many of the quartz grains are dissolved, the formation can collapse and decrease permeability.

A third problem is precipitation of acid reaction products from the spent acid-treating solution. These precipitates can reduce the formation permeability. Examples of these precipitates include amorphous silica gel and salts of fluosilicic acid.

SUMMARY OF THE INVENTION

The present invention provides a method of dissolving minerals in a subterranean formation. It involves wearing the minerals with a fluoride-containing compound in the presence of an organic acid, wherein the fluoride compound concentration is in the range of from 0.007 N to 0.05 N. Preferably, the hydrogen ion concentration is less than 0.02 N, more preferably less than 0.004 N. Preferably, the organic acid is acetic acid and the treatment is carried out at a temperature of at least 350° F.

In one embodiment, the fluoride-containing compound is hydrofluoric acid. In another embodiment, a fluoride salt (such as ammonium fluoride or ammonium bifluoride) and an organic acid am introduced into the formation in alternating stages.

BRIEF DESCRIPTION OF THE DRAWINGS

In order to assist the understanding of this invention, reference will now be made to the appended drawings. The drawings are exemplary only, and should not be construed as limiting the invention.

FIG. 1 of the normalized permeability increase during laboratory core flood tests using acetic acid and hydrofluoric acid at 380° F. Normalized permeability increase is the measured permeability divided by the initial permeability at the beginning of the acetic acid and hydrofluoric acid stage. Ten percent acetic acid was used with each of the live different hydrofluoric acid concentrations shown on the figure.

FIG. 2 is a graph of the normalized permeability increase during alternating stages of acetic acid and ammonium fluoride at 380° F.

DETAILED DESCRIPTION OF THE INVENTION

In its broadest aspect, the present invention involves a method of dissolving minerals in a subterranean formation by wearing the minerals with a fluoride-containing compound in the presence of an organic acid. The fluoride compound concentration is in the range of from 0.007 N to 0.05 N.

By "minerals," we mean quartz fragments, feldspars, and clays. By "feldspars," we mean aluminosilicates having the general formula $Na_yCa_{1-y}Al_{2-y}Si_{2+y}O_8$, ($0 \leq y \leq 1$). By "clays," we mean hydrated aluminosilicates including kaolinitc, montmorillonite, attapulgite, illite, bentonite, halloysite, chlorite, and mixtures thereof. By "dissolving minerals," we mean causing them to pass into solution. By "treating the minerals with a fluoride-containing compound," we mean deliberately contacting the minerals with a fluoride-containing compound for the purpose of dissolving the minerals. By "ion concentration," we mean the number of free ions in a reference volume of solution. By "organic acid," we mean a low molecular weight carboxylic acid, such as acetic acid, propanoic acid, or butanoic acid, and derivatives thereof.

There are three reasons for using a very low concentration of fluoride-containing compound.

One reason is to minimize the permeability damage which often precedes a permeability increase. FIG. 1 shows that an :initial decrease in permeability occurred for the 0.25 N (0.5 wt %) and 0.75 N (1.5 wt %) hydrofluoric acid tests. This initial decline in permeability was not observed at 0.05 N (0.1 wt %) hydrofluoric acid and below.

Another reason is to maximize the permeability response. FIG. 1 shows the largest permeability increase occurred at 0.025 N (0.05 wt %) hydrofluoric acid.

A third reason is to avoid excessive quartz dissolution. The reactivity of hydrofluoric acid with formation minerals is a strong function of temperature. At temperatures above 350° F., high hydrofluoric acid concentrations can dissolve an excessive mount of quartz. This can lead to formation collapse and reduced permeability. Excessive quartz dissolution was observed in the form of a large void space that developed in the core sample during the 0.75 N (1.5 wt %) hydrofluoric acid test.

An organic acid, such as acetic acid, is used instead of hydrochloric acid in order to reduce corrosion of well equipment. Corrosion rate is related to the hydrogen ion concentration. High hydrogen ion concentration means high corrosion rate. Hydrochloric acid is a strong acid, which completely dissociates into hydrogen and chloride ions. A low concentration of hydrochloric acid (5 wt %) results in a relatively high hydrogen ion concentration (about 1.4 N). Acetic acid is a weak acid, which does not completely dissociate into hydrogen and acetate ions. Acetic acid can be used in a relatively high concentration (10 wt %) and still result in a very low hydrogen ion concentration (about 0.02 N).

In one embodiment, fluoride is supplied by hydrofluoric acid. U.S. Pat. No. 2,094,479 (Vandergrift), which is hereby incorporated by reference for all purposes, shows the use of hydrofluoric acid at concentrations of 60 wt % for sandstone formations and 0.5 to 10 wt % for calcareous formations. Unlike what is taught in Vandergrift, we have found that hydrofluoric acid concentrations between 0.014 wt % (0.007 N) and 0.1 wt % (0.05 N) are effective in sandstone formations at temperatures greater than 350° F. U.S. Pat. No. 4,414,118 (Murphey), which is hereby incorporated by reference for all purposes, shows sandstone acidizing using hydrofluoric acid at concentrations as low as 0.05 N with a mineral acid chosen from the group consisting of hydrochloric acid, nitric acid, sulfuric acid, and phosphoric acid. Unlike what is taught in Murphey, we have found that the mineral acid is unnecessary, and that the hydrofluoric acid concentration should be lower than shown by Murphey.

In another embodiment, the fluoride is supplied by a fluoride salt, such as ammonium fluoride or ammonium bifluoride. The fluoride salt and the hydrogen ions are introduced in alternating stages. U.S. Pat. No. 4,056,146 (Hall), which is hereby incorporated by reference for all purpose, shows the use of fluoride salts with a fluoride ion concentration from 0.2 N to 5 N and strong, inorganic acids with a hydrogen ion concentration from 0.2 N to 5 N in alternating stages. Unlike what is taught in Hall, we have found that fluoride concentrations less than 0.05 N and hydrogen ion concentrations less than 0.02 N are effective in sandstone formations at temperatures greater than 350° F. We have found weak, organic acids to be the preferred source of hydrogen ions. Also, unlike what is shown by Hall, we have found that the hydrogen ion concentration need not be as large as the fluoride ion concentration.

EXAMPLES

The invention will be further illustrated by following examples which set forth particularly advantageous method embodiments. While the Examples are provided to illustrate the present invention, they are not intended to limit it.

EXAMPLE 1

Core material from a formation with a temperature over 400° F. was treated with 10% acetic acid blended with five different concentrations of hydrofluoric acid. The hydrofluoric acid concentrations were 0.007 N, 0.025 N, 0.05 N, 0.25 N, and 0.75 N. The hydrogen ion concentrations for these tests were 0.0025 N, 0.0030 N, 0.0035 N, 0.0073 N, and 0.016 N, respectively. The best permeability increases were obtained with the 0.025 N and 0.05 N hydrofluoric acid concentrations. These tests, which are illustrated in FIG. 1, were completed at the maximum temperature capability of the test facility, approximately 376°–380° F.

EXAMPLE 2

Core material from a formation with a temperature over 400° F. was treated with alternating stages of 10% acetic acid and 0.05 N (0.2%) ammonium fluoride. The hydrogen ion concentration during the acetic acid stages was about 0.0025 N. This test, which is illustrated in FIG. 2, was also completed at the maximum temperature capability of the test facility, approximately 376°–380° F.

While the present invention has been described with reference to specific embodiments, this application is intended to cover those various changes and substitutions that may be made by those skilled in the art without departing from the spirit and scope of the appended claims.

What is claimed is:

1. A method of dissolving minerals in a subterranean formation comprising treating the minerals with a fluoride-containing compound in the presence of an organic acid, wherein the fluoride-containing compound concentration is in the range of from 0.007 N to 0.05 N.

2. A method according to claim 1 wherein the hydrogen ion concentration is less than 0.02 N.

3. A method according to claim 2 wherein the hydrogen ion concentration is less than 0.004 N.

4. A method according to claim 1 wherein the organic acid is acetic acid.

5. A method according to claim 1 wherein the fluoride-containing compound is hydrofluoric acid.

6. A method according to claim 1 wherein the fluoride-containing compound is a fluoride salt.

7. A method according to claim 6 wherein the fluoride salt and the organic acid are introduced into the formation in alternating stages.

8. A method according to claim 6 wherein the fluoride salt is selected from the group consisting of ammonium fluoride and ammonium bifluoride.

9. A method according to claim 1 wherein the treatment is carded out at a temperature of at least 350° F.

* * * * *